(12) United States Patent
Bifano

(10) Patent No.: US 6,705,345 B1
(45) Date of Patent: Mar. 16, 2004

(54) MICRO VALVE ARRAYS FOR FLUID FLOW CONTROL

(75) Inventor: Thomas Bifano, Mansfield, MA (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 09/708,887

(22) Filed: Nov. 8, 2000

Related U.S. Application Data

(60) Provisional application No. 60/163,977, filed on Nov. 8, 1999.

(51) Int. Cl.[7] .................... F16K 11/22; F16K 11/24
(52) U.S. Cl. ............. 137/597; 137/599.07; 251/129.01
(58) Field of Search .................... 137/597, 606, 137/599.07; 251/129.01

(56) References Cited

U.S. PATENT DOCUMENTS

| | | | |
|---|---|---|---|
| 5,536,963 A | 7/1996 | Polla | 257/417 |
| 5,637,458 A | 6/1997 | Frankel et al. | 435/6 |
| 5,767,877 A | 6/1998 | Mei et al. | 347/54 |
| 5,901,939 A | 5/1999 | Cabuz et al. | 251/129.02 |
| 5,941,501 A * | 8/1999 | Biegelsen et al. | 251/129.01 |
| 6,116,863 A * | 9/2000 | Ahn et al. | 417/322 |
| 6,120,002 A * | 9/2000 | Biegelsen et al. | 251/129.01 |
| 6,126,140 A * | 10/2000 | Johnson et al. | 251/129.01 |

* cited by examiner

*Primary Examiner*—Stephen M. Hepperle
(74) *Attorney, Agent, or Firm*—Weingarten, Schurgin, Gagnebin & Lebovici LLP

(57) ABSTRACT

An array of micro valves, and the process for its formation, used for control of a fluid flow and having a substrate with a plurality of apertures for directing the fluid to flow from one side to another. A micromechanically formed fluid seal surrounds each aperture along with a valve diaphragm associated with each seal and micromechanically formed to selectively open and close the aperture by making contact with the seal. Electrical contact is made to the valve diaphragms and substrate for selective valve closure or opening. A conduit leads a fluid flow to the underside of the array and a further conduit leads it away from the array after passing through the selectively opened diaphragms.

13 Claims, 2 Drawing Sheets

MICRO VALVE ARRAYS FOR FLUID FLOW CONTROL

CROSS REFERENCE TO RELATED APPLICATIONS

This application claims priority from U.S. Provisional Application No. 60/163,977, filed Nov. 8, 1999, which is incorporated herein by reference.

STATEMENT REGARDING FEDERALLY SPONSORED RESEARCH OR DEVELOPMENT

This invention was made with U.S. Government Support under Contract Number DAAG 55-97-1-0114, awarded by the Army Research Office. The Federal Government therefore has certain rights in the invention.

FIELD AND BACKGROUND OF THE INVENTION

In applications that include biomedical dosing, biochemical reaction systems, fluidic mixing, and fluidic regulation, the precise control of the flow of a fluid on a very small scale is desired. To accomplish this objective in the past, single valve systems have been provided where the valve opening is varied according to the rate of flow desired. These are not inherently linear, varying with the third power of the channel cross sectional height. In order to achieve the control required of such assemblies, complex control systems are required which can be costly compared to the fabrication costs of micro machined arrays.

SUMMARY OF THE INVENTION

The present invention provides for fluid flow regulation through an array of microvalves. Micro valves are fabricated using photolithography techniques on semiconductor material and produce extremely small dimension valves. In such a situation, it is important that the individual valves in the array have small leakage in the shut state, have a linear flow relationship to both pressure differentials over a range of pressures and over the full array from one to all valves open.

To accomplish this purpose, an array of micro valves, used for control of a fluid flow, has a substrate with a plurality of apertures for directing the fluid to flow from one side to another. A micromechanically formed fluid seal surrounds each aperture along with a valve diaphragm associated with each seal and micromechanically formed to selectively open and close the aperture by making contact with the seal. Electrical contact is made to the valve diaphragms and substrate for selective valve closure or opening. A conduit leads a fluid flow to the underside of the array and a further conduit leads it away from the array after passing through the selectively opened diaphragms.

DESCRIPTION OF THE DRAWING

The present invention is more fully described below in conjunction with the drawing of which.

DETAILED DESCRIPTION

The present invention provides for fluid flow regulation through an array of microvalves. Micro valves are fabricated using photolithography techniques on semiconductor material and produce extremely small dimension valves. In such a situation, it is important that the individual valves in the array have small leakage in the shut state, have a linear flow relationship to both pressure differentials over a range of pressures and over the full array from one to all valves open.

Figure 1:
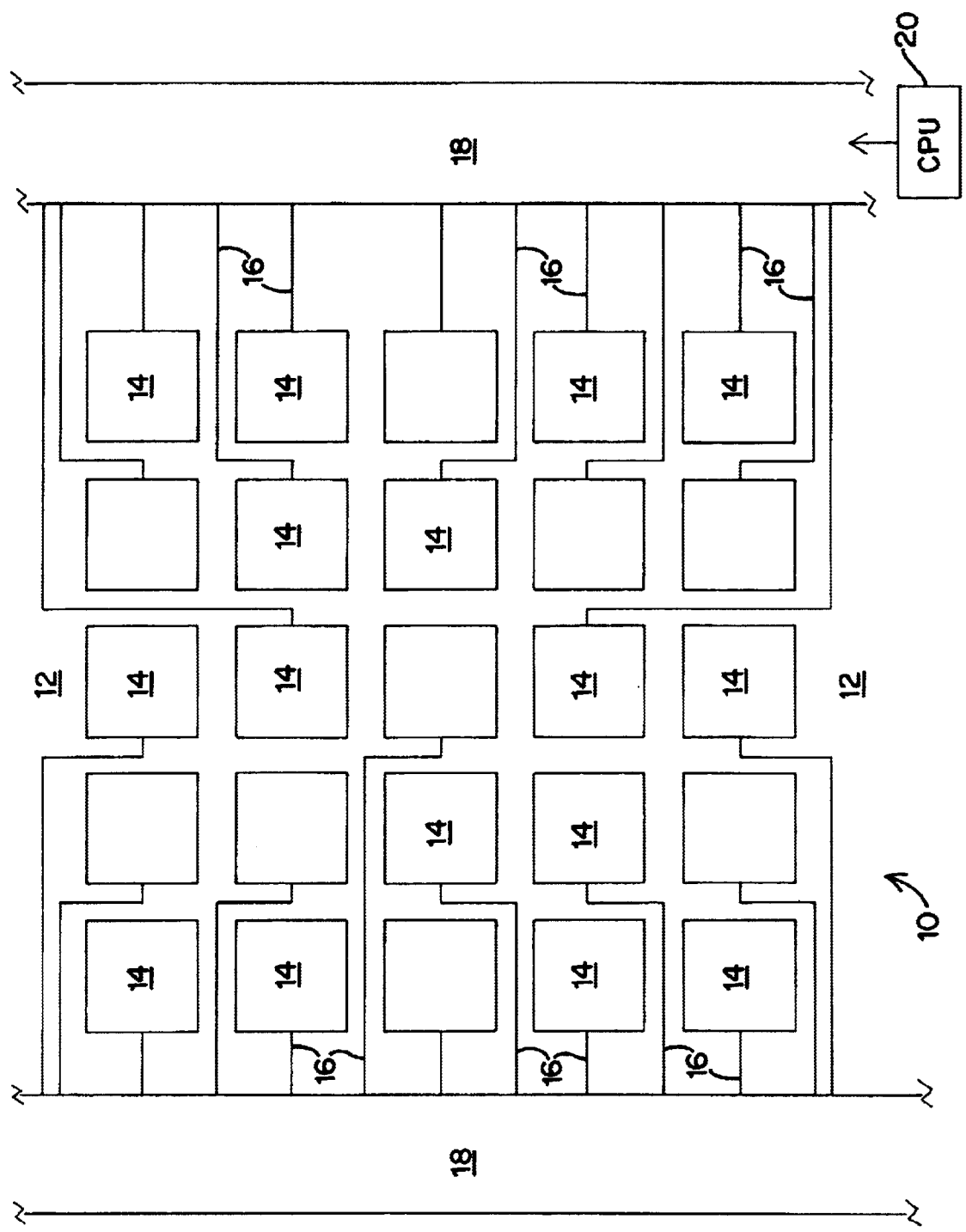
FIG. 1 is a top diagrammatic view of an array of micro valves according to the invention.

Such an array is illustrated in FIG. 1 where the array 10 is formed by micro mechanical construction on a substrate 12. Individual valves 14 are formed on the substrate 12, typically of a semiconductor like silicon, using micro mechanical techniques including photolithography to produce layers of desired semiconducting and insulating materials. The valves typically have a movable diaphragm or other actuable element that is electrostatically or otherwise attracted to the substrate 12 to close the valve which is, when not so attracted, in an open state. The valves are also advantageously individually controlled through the provision of a plurality of electrical conductors 16 formed on the substrate 12 separately connecting each valve actuable element to a bus 18. The bus is typically fed valve actuation signals from a CPU 20 that allows a selected number of the valves 14 in the array 10 to be opened or closed. In turn the flow of a fluid through the array is linearly controlled by the number of valves open. Valve spacing in the range of mm to fractions of mm are possible.

Figure 2:
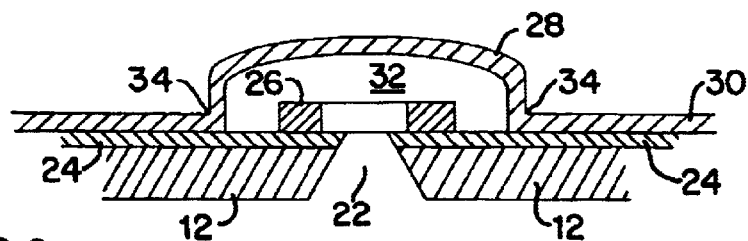
FIG. 2 is a sectional view of a single micro valve according to the invention.

FIG. 2 illustrates in cross section the construction of a typical valve 14 in the array 10. As shown there the valve has a substrate 12 with an aperture 22 for each valve in the array. The substrate upper surface has an insulating layer 24 thereon, also apertured in the place of the aperture 24. Surrounding the apertured insulating layer 24 and aperture 22 is a micromechanically formed sealing ring 26 which surrounds the aperture 22. Above the sealing ring 26 is a diaphragm which is normally offset from the sealing ring 26 but can be pulled down onto it forming a seal that blocks the flow of a fluid through the aperture 22. The diaphragm is formed in a layer 30 of semiconductor material by processes described below to leave a cavity 32 between the sealing ring 26 and diaphragm 28. The diaphragm 28 as shown is attached at only two opposite edges 34 to the substrate 12. The portions that face in and out of the page are open to allow any fluid flowing through the aperture 22 from the underside of the substrate 12 to continue on beyond the diaphragm 28 on the top side of the substrate 12. When the diaphragm 28 is pulled down into contact with the sealing ring 26, the flow is stopped with a relatively low leakage.

The substrate 12 and diaphragm 28 are typically semiconductor materials made sufficiently conductive to permit an electrostatic attraction voltage of a few volts to be applied thereto and pull the diaphragm down to seal the diaphragm 28 to the sealing ring 26. The layer 30 may be thinned to form the conductors 16 of FIG. 1 or separate metalizations used, all according to well known procedures of micro mechanical constructions.

Figure 3:
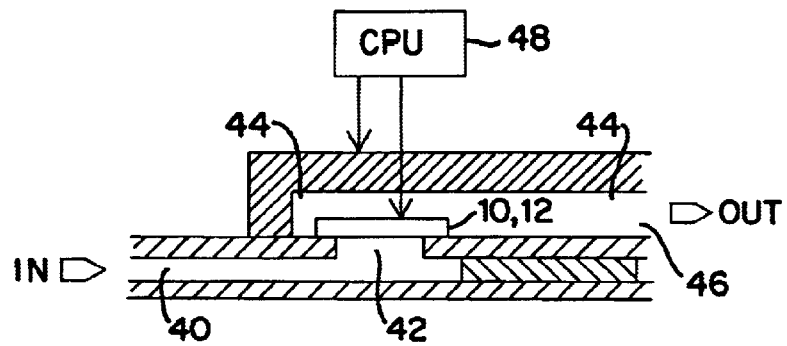
FIG. 3 illustrates partially in section a fluid flow regulator according to the invention.

A completed array 10 on a substrate 12 is shown in FIG. 3 assembled into a conduit system having a an inlet passage 40 leading to an aperture 42 over which the array 10 is sealed, exposing the bottom surface to the conduit 40. The top surface of the array 10 opens into a top conduit 44 which exits to an output 46. A CPU 48 is connected to the substrate 12 and array 10 to provide selective valve operation.

For valve diaphragm spacing up to about five microns (above which breakdown may become a problem) a few volts up to a few tens of volts of potential is sufficient. The voltage is a function of the pressure that the valve is to withstand in the fluid environment, and the diaphragm gap is a function of the flow rate per valve desired. Because the flow rate variation with the gap affects flow rate at the third power of gap spacing while the voltage varies at the second power, some flexibility is given in design to achieve desired parameters, constrained at the limit by the breakdown voltage. Valve dimensions in the range of 300–500 horizontal microns is typical.

The process of formation of the array is illustrated in FIGS. 4A–4E, showing a representative single micro valve. A substrate 50 is provided in silicon or polysilicon on which the array is to be formed and is provided with or given a conductivity sufficient to support the electric potential necessary to cause valve closing as described above. An insulating layer 52 of typically silicon nitride is formed over the substrate to a thickness of, for example, half a micron. Over that is grown or deposited the ring seals 54 using photolithography processes of deposition, resist exposure and development and etching to leave the ring pattern. A sacrificial layer 56 of silicon dioxide, providing the diaphragm spacing, is next formed and patterned around the ring seals 54, typically to a thickness of half a micron. A layer 58 of polysilicon is then deposited over the silicon dioxide and silicon nitride and has or is given sufficient conductivity for the application of the valve actuating potential.

Figure 4A:
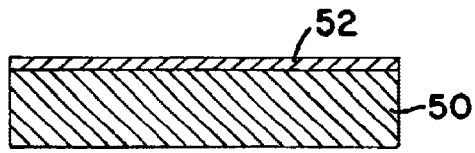
FIGS. 4A–4F illustrate the steps in the process of fabrication of the invention.
Figure 4B:
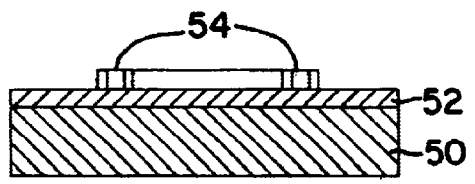
Figure 4C:
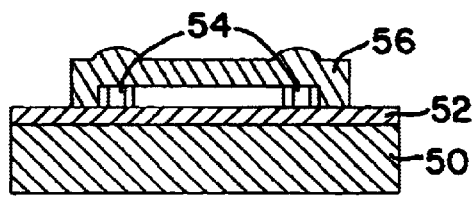
Figure 4D:
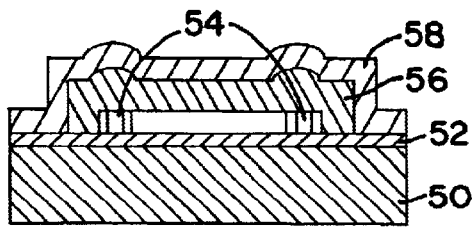
Figure 4E:
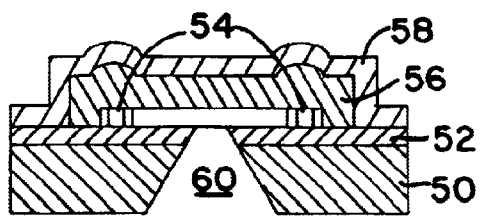
Figure 4F:
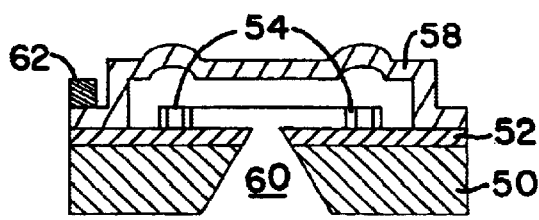

In FIG. 4E the back surface of the substrate 50 is patterned and etched photolithographically to leave an aperture 60 through the substrate 50 of polysilicon and the silicon nitride 52. In the step of FIG. 4F, the sacrificial layer 56 of silicon dioxide is dissolved or etched. Finally, metalizations may be added to provide bonding pads 62 to each diaphragm formed by the layer 58. These can be contacted by wire bonds, or the metalizations can be applied to the substrate surface as shown in FIG. 1.

The invention may be practiced in other forms and by other processing, in micromechanical, precision machining or other ultra small fabrication techniques. Accordingly its scope is limited only in accordance with the following claims.

What is claimed is:

1. An array of micro valves for control of a fluid flow comprising:
    a substrate having a plurality of apertures for directing the fluid to flow from one side to an other;
    a micromechanically formed fluid seal surrounding each said aperture, an insulating layer separating each said seal from said substrate;
    a valve diaphragm associated with each said seal and micromechanically formed to selectively open and close said aperture by making contact with said seal;
    a conductive region of said substrate associated with each said aperture;
    said diaphragm having an electrical conductivity;
    a network of micromechanically formed conductors individually accessing each said diaphragm.

2. The array of claim 1 wherein said substrate is a semiconductor material.

3. The array of claim 2 wherein said semiconductor material is substantially silicon.

4. The array of claim 1 wherein each said seal is of substantially silicon.

5. The array of claim 4 wherein said insulating layer comprises silicon nitride.

6. The array of claim 1 wherein each said diaphragm is a semiconductor material.

7. The array of claim 6 wherein each said diaphragm is substantially of silicon.

8. The array of claim 7 wherein said diaphragm is a silicon diaphragm attached to said substrate to leave fluid passages between itself and said substrate when each said diaphragm is not in contact with said seal.

9. The array of claim 1 wherein said conductors are formed micromechanically.

10. The array of claim 9 wherein said conductors are substantially of silicon or a metalization.

11. A process for regulating the flow of a fluid medium comprising the steps of:
    providing an array according to claim 1;
    applying fluid to a first side of said array;
    collecting fluid from an opposite side of said array.

12. An array of micro valves for control of a fluid flow comprising:
    a substrate having a plurality of apertures for directing the fluid to flow from one side to an other;
    a micromechanically formed fluid seal surrounding each said aperture, each said seal being of substantially silicon, an insulating layer separating each said seal from said substrate;
    a valve diaphragm associated with each said seal and micromechanically formed to selectively open and close said aperture by making contact with said seal;
    a conductive region of said substrate associated with each said aperture;
    said diaphragm having an electrical conductivity; and
    a network of micromechanically formed conductors individually accessing each said diaphragm.

13. The array of claim 12 wherein said insulating layer comprises silicon nitride.

* * * * *